INVENTOR
David J. Goodfriend
BY
ATTORNEYS

Aug. 17, 1965          D. J. GOODFRIEND          3,200,497

METHOD OF REPRODUCING DENTAL RELATIONSHIPS ON AN ARTICULATOR

Filed May 21, 1962          4 Sheets-Sheet 2

INVENTOR
David J. Goodfriend
BY
ATTORNEYS

Aug. 17, 1965   D. J. GOODFRIEND   3,200,497
METHOD OF REPRODUCING DENTAL RELATIONSHIPS ON AN ARTICULATOR
Filed May 21, 1962   4 Sheets-Sheet 4

INVENTOR
David J. Goodfriend
BY
ATTORNEY

3,200,497
METHOD OF REPRODUCING DENTAL RELATIONSHIPS ON AN ARTICULATOR
David J. Goodfriend, Philadelphia, Pa., assignor to Prosthetics Research Incorporated, Philadelphia, Pa., a corporation of Delaware
Filed May 21, 1962, Ser. No. 196,339
7 Claims. (Cl. 32—32)

The present application is a continuation-in-part of my copending application, Serial No. 835,493, filed August 24, 1959, for Dental Method and Apparatus, now Patent No. 3,084,438.

The present invention relates to methods of establishing the correct dimensional jaw-tooth-temporomandibular-cranial relationships for the production of dental replacements and reconstructions such as artificial dentures, crowns, bridges, and inlays, and apparatus related thereto.

A purpose of the invention is to permit the dentist to obtain and physically establish the correct dimensional relationships for the creation of a denture, producing an impression combination which is sturdy and capable of shipment, and which can be sent to the dental laboratory and there used to provide all the data necessary to produce a tooth replacement or tooth reconstruction in the form of a denture, or a crown, or a tooth set-up preliminary to making a denture.

A further purpose is to place a bite web in the patient's mouth and to fix the relationship of the bite web to a reproducible reference point by setting an extension from the bite web in an impression cup by plaster or the like.

A further purpose is to position a face bow properly on the face of a patient with a centering guide pin correctly placed at the mesio-incisal point, to remove the center guide pin and place an impression cup at the reference point on the face bow, to place a bite web in the mouth of the patient, with an extension into the impression cup, and to fix the proper relationship of the bite web to the impression cup by making a cast, thus assuring that the bite web and impression cup can be shipped together and can reestablish at the dental laboratory the relationships previously obtained.

A further purpose is to set up the combination of the impression cup and the bite web at a reference point on an articulator and then to mount jaw casts in the articulator against the bite web.

A further purpose is to place an occlusal guide in the articulator and to set up the teeth against the jaw casts in conformity with the occlusal guide.

A further purpose is to employ an occlusal guide which is a portion of a sphere.

A further purpose is to hinge the occlusal guide on a horizontal axis adjacent to its support.

A further purpose is to provide an occlusal guide which extends between the jaw casts and mounts the teeth.

A further purpose is to provide a U-shaped occlusal guide which surrounds the jaw casts.

A further purpose is to provide for adjustment of the position of the ends of the U-shaped occlusal guide in the vertical direction and also with respect to the articulator pivot.

A further purpose is to support a tooth mounting from the occlusal guide.

Further purposes appear in the specification and in the claims.

In the drawings I have chosen to illustrate a few only of the numerous embodiments in which the invention may appear, selecting the forms shown from the standpoints of convenience in illustration, satisfactory operation and clear demonstration of the principles involved.

Describing in illustration but not in limitation and referring to the drawings:

Great difficulty has been encountered in the prior art in transmitting the information derived by the dentist in respect to dental reconstructions and replacements required by a patient to the dental laboratory in such form that the dental laboratory can produce a scientific and satisfactory denture or dental reconstruction. Much discomfort to patients and trouble in redoing dentures has been necessitated by the fact that there is at the present time no completely satisfactory way of providing the information derived by the dentist to the laboratory in a form that will assure the production of a satisfactory denture or dental reconstruction. It has been established that many apparently unrelated symptoms such as vertigo, deafness and ear noises are attributable to unscientifically designed dentures and dental reconstructions. Many of the methods depend upon estimating the correct positions of the dental casts and biting surfaces of the teeth by the laboratory, and where measurements are used they often fail to produce accurate results.

Dental reconstruction and replacement of teeth such as dental crowns and inlays, fixed and removable bridgework, and partial and complete artificial dentures involve alterations of the static and dynamic interrelationships of the upper and lower jaws, the various parts of the temporomandibular joints and the biting surfaces of the lower and upper teeth. The effectiveness, comfort and acceptability of these dental reconstructions and replacements depend upon the harmony of the static and dynamic relationships of the biting surfaces of the teeth and the articular surfaces of the temporomandibular joints. In order to achieve this harmony, it is necessary to record the patient's cranio-temporomandibular-jaw relationships in a manner which will enable the models of the patient's teeth and jaws to be mounted on an articulator upon which the dental reconstructions and replacements are constructed in such a manner that they duplicate on the articulator the patient's jaw-tooth-temporomandibular joint-cranial relationships. The construction of harmonious dental reconstructions and replacements also requires that their biting surfaces be formed and located so that they meet and articulate in harmony with the static and dynamic relationships of the temporomandibular joints.

The harmony of dental reconstructions and replacements also depends upon the form of the biting surfaces of the teeth and their situation in the interjaw space of the models of the patient's jaws on an articulator on which they duplicate the patient's jaw-cranio-temporomandibular joint relationships to those parts of the articulator which represent the jaw temporomandibular joint and cranium. These procedures involve recording these relationships of the patient in a manner and by a method by which they may be shipped or transported without distortion or alteration to the technician or commercial laboratory who makes these reconstructions and replacements for the dentists and their patients.

Thus, the harmony, effectiveness and comfort of the dental reconstructions and replacements depend upon the registration and recording of the patient's tooth-jaw-temporomandibular joint-cranial relationships and their duplication on an articulator by the attachment of models or reproductions of the patient's teeth and jaws to the articulator in accordance with the registrations and records transmitted to the dental technician. The articulator consists of a mechanism in which a lower arm represents the lower jaw and an upper arm represents the upper jaw and cranium. These are joined in the back part of the articulator by means of two sliding hinge joints which represent the patient's temporomandibular joints, the axes of which are referred to as condyle points. The front of the articulator has a vertical rod which rests upon a platform. This establishes and maintains the vertical relationships of the upper and lower arm of the articulator. The vertical rod of the articulator has a centering mark or reference point which is in constant relationship to the arm and condyle points of the articulator.

The variable factors in the patient's tooth-jaw-temporomandibular joint-cranial relationships are between the condyle points and the jaws and teeth, and between the latter and the cranium. These variable relationships on the articulator are between the models of the teeth and jaws and the condyle points, the arms of the articulator and the vertical rod of the articulator. Since the vertical rod of the articulator and its center point are in constant relationships with the condyle points and the arms of the articulator, my invention utilizes this constant articulator relationship as the basis of registering the patient's jaw-tooth-temporomandibular joint-cranial relationships and duplicating them on the articulator with models of the patient's jaws and teeth.

I have found that the condyle points of an adult patient's temporomandibular joints are situated thirteen millimeters in front of the ear hole or auditory meatus on the horizontal plane of the head. This fact is important in the present invention.

My invention provides a method for registering the patient's jaw-tooth-temporomandibular joint-cranial relationships; and for duplicating these relationships of models or reproductions of the patient's jaws and teeth on an articulator. It provides a stable, compact record of these relationships which may be readily transported and shipped to outside technicians and commercial laboratories to be used by them for attaching the models of the patient's teeth and jaws to an articulator so that they duplicate on the articulator the patient's jaw-tooth-temporomandibular joint-cranial relationships.

The patient's jaw-tooth-temporomandibular joint-cranial relationships are registered by means of a bow which extends from the ear holes to the front of the face. This bow is attached in the ear holes and on the bridge of the nose by adjustable parts. The bow has an attached vertical front rod which is parallel to the so-called vertical axis of the cranium and coincides with the vertical rod of the articulator. The distance of the vertical front rod of the bow to the ear hole is fixed at thirteen millimeters longer than the articulator's dimension from the vertical rod to its condyle points. Thus, the vertical front rod of the bow is the same distance from the patient's condyle centers as is the vertical rod of the articulator from its condyle points.

The vertical front rod of the bow has a provision to accommodate an impression cup in fixed relationship to its center point. A bite-bow is provided to be fixed in relationship to the patient's jaws and teeth. It has a projection which fits loosely into the impression cup to fix the interrelationships of the bite-bow to the impression cup. These relationships are fixed by flowing plaster of Paris into the impression cup. This fixes the relation of the teeth and jaws to the center of the vertical front rod of the bow and to the patient's cranium and condyle centers. It also fixes the relationships of the patient's jaws and teeth to the center mark or reference point of the articulator's vertical rod in the same dimensional relationships as those with the center mark of the vertical front rod of the bow.

The impression cup with the bite web fixedly connected thereto by means of the hardened plaster of Paris is then removed from the face bow. This single unit of impression cup, plaster of Paris, and bite web is then sent to the commercial laboratory or dental technician where it is utilized to mount the models or reproductions of the patient's teeth and jaws on an articulator in the same relationship to the condyle points and the arms of the articulator as the patient's jaw relationships bear to the temporomandibular joints and cranium.

The second phase of my invention employs mounting blocks which provide for the duplication of the patient's jaw-tooth-temporomandibular joint-cranial relationships on the articulator. There may be variations of the mounting block. One consists of a platform in which three depressions accurately accommodate the three feet or supports of the articulator. The front of the platform has a vertical projection which carries a horizontal projection and vertical rod with a centering point which duplicates the center of the vertical rods of the face bow and the articulator and accommodates the impression cup and bite web at that centering point. The impression cup-bite web unit is attached to the vertical rod of the mounting platform and the models or reproductions of the patient's teeth and jaws are attached to the bite web. The articulator is placed on the mounting platform and soft plaster of Paris is flowed between the models of the patient's teeth and jaws and the articulator so that the models are thereby attached to the articulator by the hardened or set plaster of Paris. The bite web is then detached from the models and the articulator is removed from the mounting block with the result that the models or reproductions of the patient's teeth and jaws are now attached to the articulator in the same relationship to the condyle points and arms of the articulator as those between the patient's teeth and jaws with his temporomandibular joints and cranium.

Having mounted models of reproductions of the patient's teeth and jaws on the articulator in a manner which duplicates the patient's cranio-temporomandibular joint-jaw-tooth relationships, the attainment of harmonious static and dynamic articulation of the biting surface of the teeth with the articulating surfaces of the temporomandibular joints depends upon the form and location of the biting surfaces of the artificial and reconstructed teeth in relationship to the articulating surfaces of the joints. I have found that the harmonious form of the biting surfaces of the teeth is a segment of a sphere the radius of which is the dimension from the condyle point to the point between the biting edge of the center of the two upper central incisor teeth or mesio-incisor point. I have found that the harmonious location of the biting surfaces of the teeth is situated in the inter-jaw space so that it extends from the aforementioned mesio-incisal point through or parallel to the condyle points of the temporomandibular joints. My invention provides for the harmonious formation and location of the biting surfaces of dental reconstructions and replacements by means of a template which is attached to the mounting block or vertical rod of the articulator.

This template is correlated with the impression cup-bite web and the mounting apparatus so that its forward portion coincides with the mesio-incisor point of the patient as fixed by the remaining front teeth or the mesio-incisor point fixed on the bite block. With its forward portion fixed on the mounting apparatus, the right and left back portions are adjusted by set-screws to bisect the inter-ridge or inter-occlusal space between the jaws or remaining teeth of the patient's models or reproductions and to be identical with or parallel to the path of the condyle points of the articulator.

The form of the template is that of a segment of a sphere the radius of which is the dimension from the mesio-incisal point to the condyle point. I have found that the average dimension in the hundreds of patients whom I have measured during the past forty years is four inches plus or minus one half inch. These variants are minus for women and plus for broad headed males. Thus, there are three alternate templates provided, the radii of which are three and one half, four and four and one half inches.

A further provision of my invention consists of impressions or moulds of the biting surfaces of artificial teeth and tooth forms which either constitute the templates or are arranged to contact the surfaces of the templates. These are impressions of ideal set-ups of artificial teeth or tooth forms into which the artificial teeth and tooth forms are placed and waxed to the shellac plate forms of edentulous jaws or to the tooth preparations of teeth to be reconstructed. As a result of this provision of my invention, the set-up of artificial teeth and occlusal forms of teeth to be reconstructed is automated and guided by these templates to ideal harmonious form, location and articulation with the patient's temporomandibular jaw and cranial relationships.

My invention also provides a novel method for adjusting the interrelationship of the lower jaw and teeth with the upper jaw and teeth. This consists of parts which are attached to the temporomandibular joint portions of the articulator. These hold the condyle axes of the articulator in place by means of set-screws, and provide for alterations of the situation of the condyle axes along the sliding parts of the articulator's condyle paths.

I illustrate in FIGURES 1 to 7 a face bow 20 which is mounted on the head of the patient as shown. The bow comprises a bow body 21 generally of U-shape, which has straight side portions 22, diagonal connecting portions 23 and a straight front portion 24 suitably bent from square rod. At the inner end there are bearings 25 which mount ear pins 26 sliding in the bearings and having external heads 27 and internal suitably resilient ear plugs 28, conveniently of a material which will stand sterilizing such as rubber. The ear pins 26 are surrounded by nuts 30 threaded on the outer ends of the bearings and tightening friction packing 31 so that the ear pins can be pushed in until the ear plugs 28 fit firmly but comfortably in the external auditory meatus or ear hole, and the pins 26 due to the friction of the packing 31 will stay in the position set, thus determining the correct relationship of the inner ends of the face bow to the head of the patient.

It will be evident that since the external auditory meatus is behind the condyle point, allowance is made for this fact in designing the face bow, so that the distance from the ear pins of the face bow to the center of the vertical rod should be approximately 13 millimeters longer than similar dimensions on the articulator.

The front portion 24 of the face bow is surrounded by a suitably square bow slider 32 which is moved laterally until the proper central relationship of the center guide pin is established as later described, and then tightened and set in the correct position by tightening thumb screw 33 on the bow slider which works on the bow body. The slider 32 carries rigidly mounted thereon a suitably square tube 34 which receives and is rigidly fastened to a vertical front rod 35 of square cross section at a height mentioned below. When the face bow is described as being horizontal and the rod 35 is described as being vertical, it will be understood that the center of the bow is at the horizontal axis of the cranium and the vertical front rod is parallel to the vertical axis of the cranium, and that the patient may hold his head in a manner so that these axes are not truly horizontal and vertical. The vertical front rod 35 has above the bow body a suitably square vertical slider 37 riding on the rod 35 and positioned at a particular position on the rod by thumb screw 38 on the slider. The vertical slider 37 rigidly mounts a clamp 40 of square cross section which provides for front and back adjustment and is slightly inclined downwardly toward the bridge of the nose. A nose support rod 41 of square cross section extends through the clamp 40 and is held in proper adjustment position by thumb screw 42 on the clamp. The rod 41 being positioned somewhat to the side of the center of vertical rod 35 is bent at 43 to bring the nose bridge engaging piece 44, suitably of rubber, into central position at the bridge of the patent's nose.

At its lower end the vertical front rod 35 has a first reference point 45 which may simply be a mark to which adjustable structure on the bottom of the vertical front rod 35 must be positioned, but in the preferred embodiment will be a shoulder 45 caused by reducing the square cross section of the rod below the shoulder 45. A square clamp 46 is removably attached on the bottom of the vertical rod 35 until its upper end is in line with the first reference point 45. The clamp is held in position by thumb screw 47 on the clamp. The clamp rigidly supports pin 48 which extends toward the mouth of the patient and has a removable pointed centering guide tip 50 suitably of rubber or other convenient material which can be sterilized. The tip is desirably held in a predetermined position on the pin 48 by a ring spring 51.

The position of the pin 48 below the face bow is such that the distance parallel to the vertical axis of the cranium between the center of the pin 48, and the horizontal axis of the face bow is equal to the distance later to be described between the lower edge of the upper arm of the articulator and the center point of the vertical front rod of the artculator.

Figure 1:
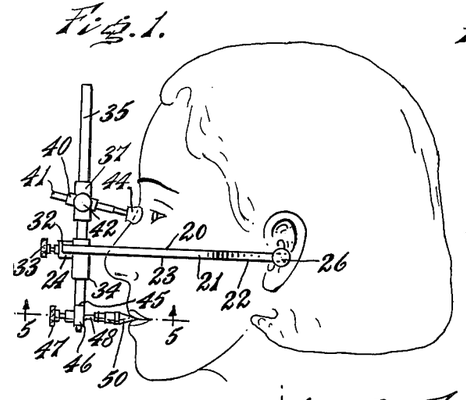
FIGURE 1 is a side elevation of the face bow used in the invention set up in operative position with the center guide pin in proper position.
Figure 2:
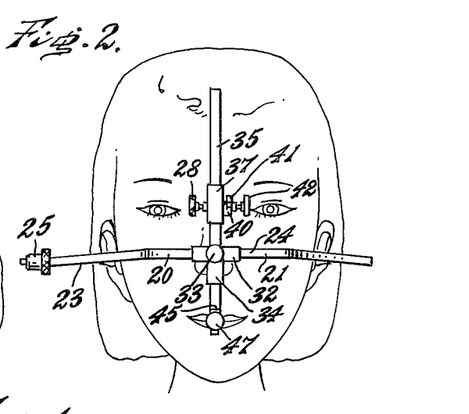
FIGURE 2 is a front elevation of FIGURE 1.
Figure 3:
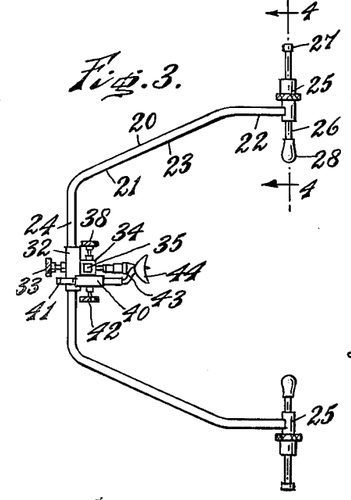
FIGURE 3 is a top plan view of the face bow omitting the patient.
Figures 4, 6:
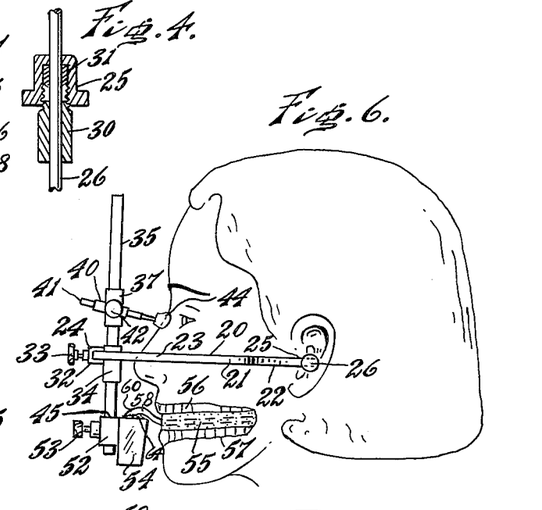
FIGURE 4 is an enlarged partial section on the line 4—4 of FIGURE 3.
FIGURE 6 is a view similar to FIGURE 1, but showing the impression cup, the bite web and the plaster in position, the mouth of the patient being broken away.
Figures 5, 7:
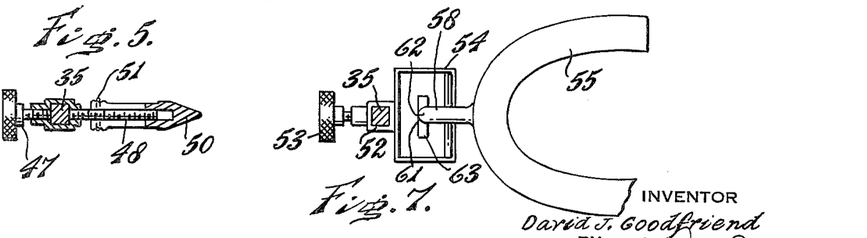
FIGURE 5 is an enlarged section on the line 5—5 of FIGURE 1.
FIGURE 7 is an enlarged top plan view of the combination of the impression cup and the bite web before the plaster has been introduced in the cup.

After the device has been properly set up on the head of the patient, the clamp 46 and the center guide pin are removed, and a square tubular clamp 52 is fitted on the lower end of the vertical front rod 35 and adjusted until its upper end coincides with the first reference point 45 as seen in FIGURE 6. The clamp 52 is held on by thumb screw 53 on the clamp shown in FIGURE 7. Positioned on the clamp and extending out from it is an upwardly impression cup 54 adapted to receive impression plaster as later explained.

A bite web 55 conforming to the shape of the teeth, and consisting of a U-shaped piece of metallic sheet with a deposit of impression wax on each face, is placed correctly in the patient's mouth as shown in FIGURE 6. If the patient has teeth in both jaws, the bite web is placed between the teeth, as in the case of making a partial denture. If, however, the patient lacks teeth in either or both jaws, a bite block or bite blocks as well known will be placed on the jaw or jaws. Therefore, upper teeth or an upper bite block is shown at 56, and lower teeth or a lower bite block is shown at 57, engaging above and below the bite web.

The bite web has an extension 58 which protrudes from the mouth at the center and has a bend 60 which carries it over to the center of the impression cup. At the forward end the extension 58 has a gooseneck portion 61 which extends down and carries at its lower end a second reference point 62 which desirably carries on either side a cross bar 63 which will be imbedded in the plaster and will position the bite web rigidly in all directions with respect to the suitably pyramid shaped cavity of the impression cup. Even if the plaster 64 after being placed in the impression cup should become detached, the plaster block can again be placed in the impression cup to its correct position.

After the combination of the impression cup, the bite web and the plaster has been established, the bite web impression cup combination is removed from the face bow and patient's mouth and is forwarded to the laboratory and there assembled in an articulator which reproduces the critical data of the patient's face and mouth.

Figure 8:
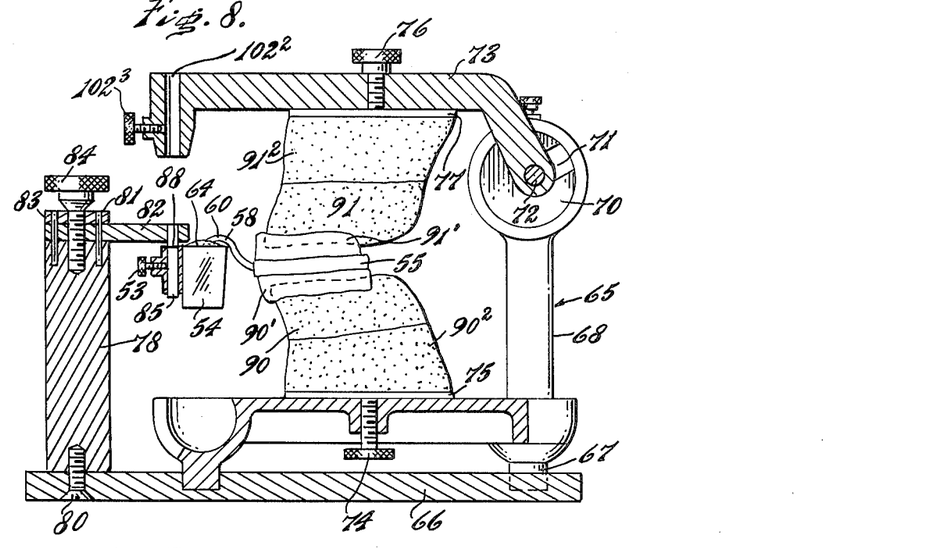
FIGURE 8 is a central vertical section of the articulator set up for use in the present invention, including the impression cup, the bite web and the jaw casts.

In FIGURE 8 I show an articulator 65 having a base 66 and suitably three legs 67 which position the base firmly and horizontally on a flat surface. At the pivot end of the articulator, uprights 68 extend upward and carry pivot head 70 similar to those on existing articulators which have pivot slots 71 which receive pivot pins 72 at opposite ends of the pivot of the upper articulator arm 73 which positions the upper jaw cast. The pivot pins 72 tend to remain central in the pivot heads but can be adjusted in slots 71 as well known in the art. A screw 74 on the base mounts a lower platform 75 which supports and adheres to the lower jaw cast and a screw 76 through the arm 73 secures on the lower surface of the arm an upper platform 77 which adheres to and supports the upper jaw cast.

A pedestal 78 is suitably mounted on the base 66 as by a screw 80, and the screw at the top carries suitably protruding aligning pins 81 which engage and maintain a bracket 82 central with respect to the articulator. Above the bracket 82 is a washer 83 which also has openings engaging the pins 81. A thumb screw 84 is threaded into the pedestal 78 and through the bracket 82 and the washer 83 to anchor the bracket firmly in position. The bracket has suitably mounted rigidly thereon and depending vertically therefrom a square rod 85 which is located as follows:

The vertical axis of the rod 85 is horizontally displaced from the pivot 72 corresponding to the condyle centers of the articulator by a projected distance (measured horizontally) which is 13 mm. less than the distance from the meatal rests of the face bow to the axis of the vertical front rod 35. The rod 85 has a vertical reference 88 which bears the same relation vertically on the articulator that the reference 45 on the face bow bears to all of the various critical reference points of the patient so that by establishing the impression cup and bite web with respect to the reference 88 on rod 85 of the mounting platform of the articulator, the exact conditions of the patient's critical dimensions will be reestablished in relation to the reference points of the articulator.

Casts of the patient's jaw and/or teeth and also suitable bite blocks if required have been made by the dentist. The upper cast 91 suitably with the upper bite block 91' are attached to the bite web, and then secured to a platform 77 on the arm of the articulator by plaster of Paris $91^2$. The lower cast 90 and the lower bite block 90' if any are secured to the bite web and fastened to the lower platform 75 by plaster of Paris $90^2$.

Figure 9:
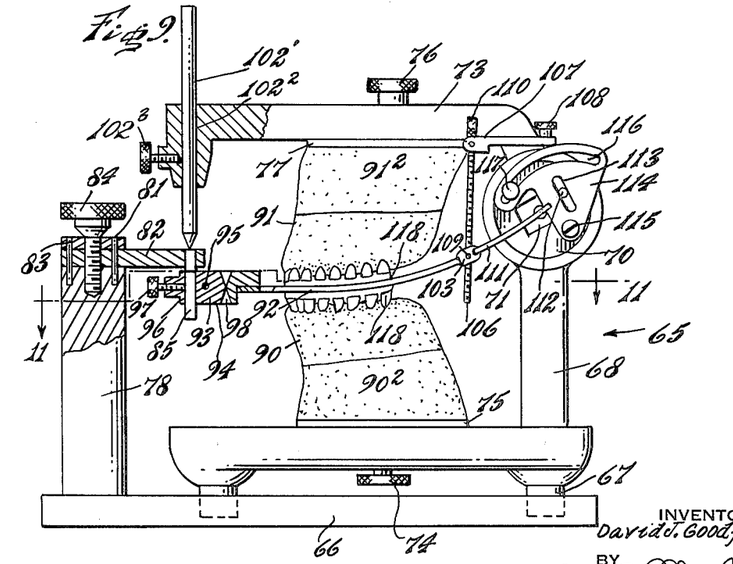
FIGURE 9 is a side elevation of the articulator showing the preferred occlusal guide and the tooth mounting, partly in central vertical section.
Figures 10, 11, 12:
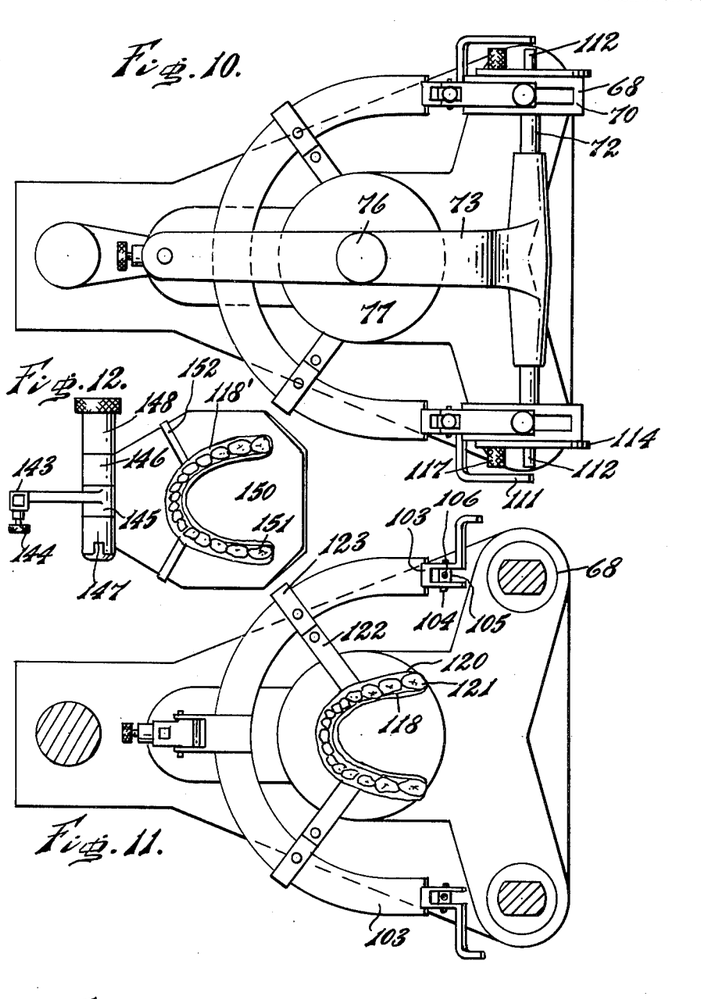
FIGURE 10 is a top plan view of the articulator of FIGURE 9 omitting the jaw casts.
FIGURE 11 is a section on the line 11—11 of FIGURE 9 omitting the jaw casts.
FIGURE 12 is a top plan view showing a modified form of occlusal guide and tooth mounting.

When the plaster of Paris has hardened, the articulator is opened, and the set screw 53 is loosened and the impression cup and bite web, as well as the bite blocks if any, are removed from the articulator. The contours of the jaw surfaces have been correctly established, and the laboratory can if desired insert teeth on these jaw surface contours by inspection according to previous practice, but with much greater assurance that the biting surfaces are correctly placed. It is however preferable in accordance with the present invention to use an occlusal guide as shown in FIGURES 9 to 11 or in FIGURES 12 and 13, in the preferred embodiment a U-shaped sheet 92. It is of spherical form having a radius which corresponds to the distance between the condyle centers on the one hand and the mesio-incisal point of the patient and articulator on the other hand. The spherical plate 92 is mounted at the base of the U on a bracket 93. The opposite end of the bracket forms one-half of a hange 94 pivoted at 95 on a suitable pin, and the other half of the hinge is mounted on square tubular clamp 96 which is positioned at reference point 88 on upright 81 by thumb screw 97. The hinge has adequate friction so that it will maintain its position except when firmly pressed.

In order to properly establish the horizontal position of the articulator upper arm 73, it is convenient to provide an incisal pin $102'$ which extends through the opening $102^2$ in a vertical direction and is held by thumb screw $102^3$ and conveniently engages the top of the rod 85 to support the upper articulator arm. Any other convenient means may be used to maintain the articulator upper arm horizontal.

In the preferred embodiment, the inner end of the U of the occlusal guide has fastened thereon at each end a yoke 103 (FIGURE 11) which pivotally mounts at 104 on a transverse axis a nut 105 through which threads a screw 106 which passes through an opening in a clip 107 mounted by a thumb screw 108 on the top of the pivot head 70. The screw 106 has a head 110 at the top which permits adjustment of the vertical position of the ends of the occlusal guide. The yokes 103 have indicators 111 which extend in prolongation of the curvature of the sphere to a position in line with and beyond the reduced diameter extensions 112 on the pivot pins 72. The pin extensions 112 are carried through openings in the ends of the pivot heads and also are carried through forwardly and rearwardly extending slots 113 on segments 114 which are pivoted below and behind the centers of the pivot heads on screws 115 and which have concentric with the center 115, segmental slots 116 which permit adjustment of the segments by thumb screws 117.

Suitably metallic or plastic spring tooth mountings 118 are shown in FIGURES 9 and 11 having tooth sockets 120 which receive artificial teeth 121. When reference is made herein to artificial teeth it is intended also to include tooth forms. The teeth protrude beyond the tooth sockets of the tooth mountings and are in position so that their bases engage against the jaw casts 90 or 91 as the case may be.

In the form shown the tooth mountings 118 receive two sets of teeth, biting surface to biting surface. The tooth mountings 118 are of course chosen to a size which will fit the jaw casts. The tooth mountings have at their sides metallic clips 122 which have at the ends adjoining the occlusal guide spring jaws 123 which are positioned on opposite sides of the occlusal guide (above and below) and extend radially toward the space inside the occlusal guide.

It will also be evident that instead of inserting artificial teeth for the purpose of producing dentures, the occlusal guide can be used as well known in the art to reconstruct the occlusal surfaces of natural teeth.

It is then possible, as well known in the art, with the teeth in position in the tooth mountings and the tooth mountings positioned between the jaw casts, to inject soft wax around the upper teeth and against the upper jaw cast and around the lower teeth and against the lower jaw cast as well known in the art, and thus make wax test mountings which can be returned to the dentist for trial fitting of the teeth. The reconstruction of the occlusal surfaces of natural teeth of course sometimes involves mounting cast replicas in the articulator of the natural teeth of a patient for such purposes as study of the occlusion of the natural teeth by an orthodontist and making occlusal corrections.

In operation, in order to establish correct dimensional relationships of the patient's jaw-tooth-temporomandibular joint-cranial relations upon the articulator for the creation of a denture, tooth replacement or tooth reconstruction according to the present invention, the patient is fitted with the face bow as shown in FIGURES 1 to 7 inclusive, moving the ear pins and plugs into the external auditory meati until the plugs are snug and comfortable. Releasing thumb screw 33, the clamp is slid laterally until the vertical front rod 35 is correctly placed directly in front of the center of the mouth, with due allowance for the fact that the two sides of the face may not be symmetrical. The nosepiece 44 is adjusted and clamped in place against the bridge of the nose by tightening screw 42. The clamp 46 is then placed at the lower end of the vertical front rod 35 against reference point 45 and held in place by tightening thumb screw 47. The body of the face bow is now adjusted by pivoting around the ear pins until the center guide pin 48 and the plug 50 are at the mesio-incisal point by manipulating thumb screw 38 so that when thumb screw 38 is tightened it supports the body of the face bow in the horizontal cranial line and the plug 50 at the mesio-incisal point. It has been found that in patients the distance between the horizontal transverse plane of the patient's cranium and the mesio-incisal point is approximately 35 millimeters and that this dimension is reproduced in available anatomical articulators from their horizontal line forward from their condyle axes to the mesio-incisal point of their vertical rods. Thus, in fixing the center guide pin 48 and plug 50 at the patient's mesio-incisal point, the face bow correlates the dimensional relations of the patient's mesio-incisal point to the horizontal line and condyle or temporomandibular joint axes with those of the articulator.

Now the dentist by releasing thumb screw 47 removes the mesio-incisal guide assembly from reference point 45 at the bottom of the vertical rod. A properly proportioned bite web 55 having relatively soft wax on the upper and lower surfaces of the web is then placed between the patient's teeth, or between or in bite blocks properly placed in the patient's mouth if the patient is without teeth. The extension 58 of the bite web is in relation to reference point 45 so that when impression cup 54 is placed on and attached to the bottom of the vertical rod of the face bow at reference point 45, the cross-piece 63 on the end of extension 58 of the bite web is engaged within impression cup 54.

The dentist then places impression plaster or the like at 64 in the impression cup 54 to surround and engage the cross-piece 63 of the bite web. The plaster is allowed to harden in this position, thus firmly uniting the bite web to the impression cup at an accurately determined position that relates the patient's mesio-incisal point-teeth-jaw to the temporomandibular joint (condyle) axes and horizontal cranial line to the reference point 45 of the face bow. It will be noted that the seat rest reference point 45 has been set at the patient's mesio-incisal point and that the plaster in the impression cup relates reference point 45 to the patient's mesio-incisal point-teeth-jaw-cranial line and condyle axes regardless to the relation that parts 58, 61, 62 and 63 happen to take to the empty impression cup 54 before the latter is filled with plaster to engage these parts of the bite web.

The dentist then releases thumb screw 53 and removes the impression cup and bite web together from the patient's mouth and the face bow, along with the bite blocks, if any. The face bow has then served its purpose and is removed from the patient's face.

Summarizing what has been said above, the face bow registers maxillo-cranial temporomandibular joint relations as a compact unit. The bow extends from the ear meatuses and can be adjusted to register the mesio-incisor point. The condyle centers are 13 mm. in front of the meatuses. The condyle centers are displaced from the vertical front rod of the face bow by the same distance as the articulator's condyle centers are displaced from the articulator's mounting for the impression cup. The horizontal bow is also the same distance vertically from the incisal axis as the articulator's condyle center is vertically displaced from the articulator's occlusal marker. The dimensional relations of the landmarks of the face bow and the articulator are the same and both are co-related with the mounting platform of the articulator. This makes is possible to register the reference points of patients in the plaster impression which holds the bite web when the impression cup is attached to the lower end of the vertical front rod of the face bow.

If the dentist does his own laboratory work, the combination of the bite web and impression cup held together by the plaster will be used in the dentist's laboratory, but if he has mechanical work done by an outside laboratory, the combination of the bite web, impression cup and plaster will be shipped to the laboratory. It will be noted that this is a relatively small unit which can be safely packed and will stand rough treatment of the package.

When it arrives at the laboratory, either the laboratory of the dentist or an outside laboratory, an articulator 65 is employed which has the same condyle radius as the face bow, and which is adjusted for the same critical reference dimensions in other respects. Actually in practice it has been found that one articulator will serve for almost all cases.

With the articulator opened, the clamp 52 is slid over the support 85 and adjusted to the reference point 88 on the articulator which corresponds to the first reference point on the face bow.

The bite web 55 extends into the interior of the articulator positioned in exactly the same relation to the critical dimensions on the articulator that it bore to the critical dimensions on the patient, and held in place by the plaster cast 64 in the impression cup.

The laboratory then proceeds to attach the upper and lower jaw casts which have been made as well known in the art to the upper and lower platforms of the articulator and/or the bite blocks, by reference to the previously positioned bite web. Thus the bite web acts as a controlling device to correctly position the bite blocks and/or jaw casts, for the subsequent operation of fitting the teeth. The operator can now open the articulator, and the impression cup and bite web are removed.

In the articulator the rod 102′ is aligned up with reference point 88 of the bite web and corresponds to the occlusal line. The mounting of the articulator sets the articulator in position so that its condyle centers and medio-incisor point are the same as in the face bow. Casts in the bite rims are thus related to these reference points of the articulator as are the maxilla and the mandible of the patient. The curves of occlusion are located and formed as well known in the art and as discussed below.

With the articulator open, the occlusal guide 92 is then placed in position against reference point 88 and held by tightening thumb screw 97 (FIGURE 9). Screws 106 are threaded through the nuts 105 at the ends of the occlusal guide, the indices 111 extending out until they are in prolongation of the axis of the articulator.

Any desired adjustment to place the indices correctly is made by tightening or loosening screws 106, the occlusal guide swinging around its hinge pin 95, with slight stiffness due to the adjustment of pin 101. If desired, the segment will be adjusted by loosening and then tightening thumb screws 117, in case there is evidence in the jaw casts of the fact that the axis should not be exactly symmetrical.

With the articulator open, tooth mountings 118 are placed in position in the occlusal guide, being supported by the spring clips 122. The teeth in the tooth guide, which is of spring material, suitably thin metal or plastic, are adjusted until they fit the bottom jaw cast, and then the corresponding upper teeth are adjusted until they fit the upper jaw cast when the articulator is closed. If the teeth are not of the proper size, substitutes are inserted and the process of adjustment goes on until the teeth in size and position accurately fit the jaw casts.

When the correct adjustments have been made, the laboratory then injects soft wax between each jaw cast and the teeth and finally produces two waxed tooth set-ups as well known.

The waxed tooth set-ups are removed from the tooth mountings 118 when the articulator is open and then the tooth mountings 118 are removed from the articulator, and the waxed tooth set-ups can be placed back in the articulator to test the correctness of their matching.

The tooth set-ups make correct allowance for the patient's maxillary, cranial and temporomandibular relations and for a harmonious occlusal plane.

In some cases, instead of using a remote occlusal guide which is located at a position outside the intermaxillary space, it is preferable to extend the occlusal guide into the intermaxillary space.

Figure 13:
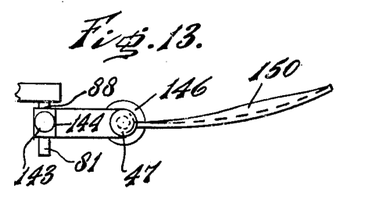
FIGURE 13 is a fragmentary side elevation similar to FIGURE 9 but showing the modified occlusal guide of FIGURE 12.

An occlusal guide of this character is shown in FIGURES 12 and 13. In this case a square tubular clamp 143 is placed on the upright 81 at the reference point 88 and held in place by thumb screw 144.

The clamp 143 supports a hinge element 145 and co-operating hinge elements 146 which, together with a hinge element 145, receives hinge bolt 147 which threads into a hinge nut 148 so that the hinge can be tightened and held in any position, the axis of the hinge being horizontal.

The hinge elements 146 support a spherical occlusal guide 150, the continuation of whose curve is in line with the pivot axis of the arm of the articulator.

Spring tooth mountings 118′ suitably of spring sheet metal or plastic, receive in this case a series of upper teeth 151 whose incisal surfaces rest against the occlusal guide 150, the surfaces remote therefrom resting against the jaw cast when the articulator is closed. Spring clips 152 on the tooth mounting hold it to the occlusal guide. When teeth of proper size and form have been fitted as indicated by proper conformity to the jaw casts, the teeth are suitably waxed into a tooth set-up as well known. Similar technique is used by placing a tooth mounting beneath the occlusal guide in fitting the teeth to the lower jaw cast.

Figure 14:
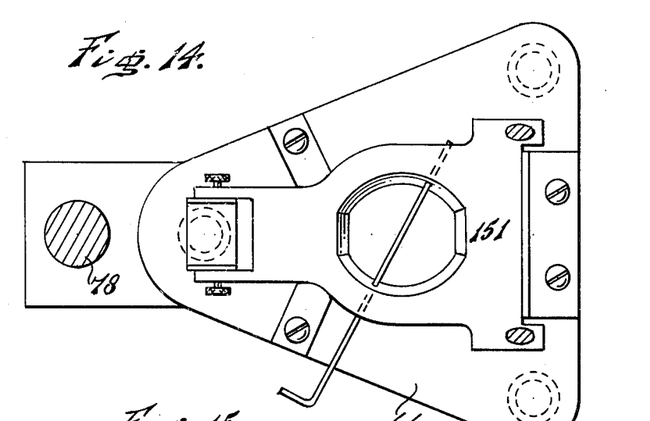
FIGURE 14 is a top plan view partially sectioned away of a Gyzi Simplex articulator and an associated platform for use in the invention.
Figure 15:
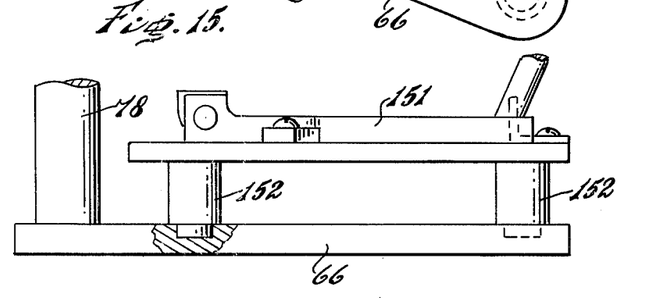
FIGURE 15 is a fragmentary side elevation of a Gyzi Simplex articulator and platform partially broken away to show the engagement with the platform and omitting the upper portion of the articulator.
Figure 16:
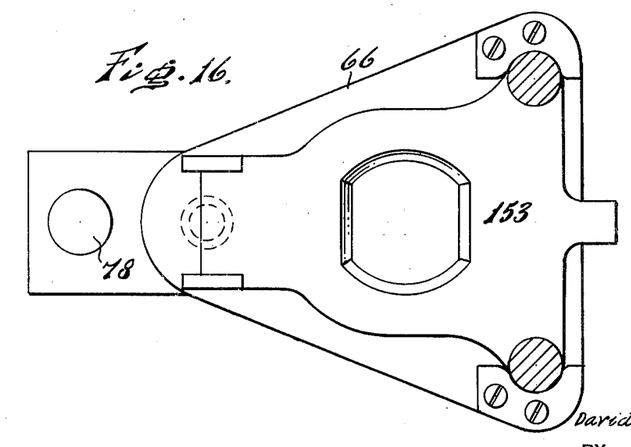
FIGURE 16 is a fragmentary top plan view of a Gyzi articulator and platform for use in the invention, the upper portion of the articulator being selected away.

FIGURES 14 to 16 show modified forms of articulators, in themselves conventional, which are mounted on modifications of the platform but otherwise employing the principles of the invention.

FIGURES 14 and 15 show a Gyzi Simplex articulator which has the top arm eliminated for simplification in illustration, and the relation of the bottom arm 151 to the platform 66 is modified by leg extensions 152 resting on the platform and raising the reference points of the articulator so that they will bear the same relation to the bite web and plaster cup that the face bow of the patient bears to the corresponding reference points. Similarly FIGURE 16 shows the lower arm 153 of a Gyzi articulator with the upper arm removed and suggests that similarly this can be mounted on the platform with the same relation to the articular reference points achieved by the bite web and the impression cup as was obtained on the face bow with respect to the critical reference points of the patient as above referred to.

Without attempting to limit or suggest that all articulators will be the same, typical dimensions for the articulator and for the face bow are as follows:

*Face bow*

The horizontal distance between the meatal rest of the face bow and the center of the vertical front rod of the face bow is 133 millimeters. This is measured along the body of the face bow.

The vertical distance between the meatal rest and the reference point 45 on the vertical front rod is 35 millimeters.

*Articulator*

The horizontal distance between the condyle centers of the articulator and the center of the rod 85 is 120 millimeters. This is 13 millimeters less than the distance from the meatuses to the vertical front rod of the face bow.

The vertical distance from the condyle centers to the reference point 88 on the articulator is 35 millimeters which is the same as the corresponding dimensions on the face bow.

In view of my invention and disclosure, variations and modifications to meet individual whim or particular need will doubtless become evident to others skilled in the art, to obtain all or part of the benefits of my invention without copying the method and apparatus shown, and I, therefore, claim all such insofar as they fall within the reasonable spirit and scope of my claims.

Having thus described my invention what I claim as new and desire to secure by Letters Patent is:

1. A method of establishing and reproducing critical reference dimensions for reconstructing and replacing teeth, which comprises setting up a face-bow having a first reference point in a predetermined relationship to the patient's condyle centers and the horizontal plane through the condyle centers of the patient, positioning an impression cup containing a deformable, age-hardening substance at the first reference point on the face-bow, placing a bite web in the patient's mouth, with an extension from the bite web protruding from the mouth and extending into the deformable age-hardening substance, allowing the deformable age-hardening substance to harden, thereby making a cast in the said impression cup around the end of the bite web extension to secure together the said impression cup and the bite web, removing the said impression cup from the said face-bow and mounting the said impression cup at another reference point in relation to an articulator which corresponds to the first reference point with respect to the condyle centers and the horizontal plane through the condyle centers of the articulator and mounting jaws casts on the articulator against the bite web while it extends from the impression cup.

2. A method of establishing and reproducing on an articulator, having an arm and a base, the patient's maxillary, cranial and temporomandibular relations for reconstructing and replacing teeth, which comprises positioning a face-bow on the patient's face and attaching the face-bow at its inner ends in the auditory meati, adjusting the face-bow to place it in the horizontal transverse plane of the patient's cranium, mounting on the face-bow a rod having a first reference point adjacent the mesio-incisal point, placing a bite web in the patient's mouth, the bite web having an extension protruding from the patient's mouth, placing an impression cup on the rod from the face-bow at the first reference point with the extension from the bite web in the impression cup, making a cast which secures the bite web by its extension in the impression cup, moving the impression cup and bite web together from the face-bow and setting them up at a reference point in relation to the articulator which is in the same position with respect to the corresponding features on the articulator which the first reference point bears to the critical features of the patient, and mounting jaw casts in the articulator against the bite web positioned in the fixed position through the impression cup.

3. A method of claim 1, which comprises removing the impression cup and the bite web from the articulator, mounting an occlusal guide on the articulator at said other reference point in proper position with respect to the inter-ridge space of the casts, mesio-incisal point and condyle centers, and making a setup of at least one artificial tooth correspondingly against one of the casts and in conformity with the occlusal guide.

4. A method of claim 2, which comprises removing the impression cup and bite web from the articulator, and making a setup of at least one artificial tooth correspondingly against one of the casts.

5. A method of claim 2, which comprises removing the impression cup and bite web from the articulator and making an occlusal reconstruction in the articulator involving the use of at least one of the casts.

6. A method of claim 2, which comprises removing the impression cup and bite web from the articulator, mounting an occlusal guide in cooperation with the articulator at said other reference point in proper position with respect to the inter-ridge space of the casts, and making a setup of at least one artificial tooth correspondingly against one of the casts and in conformity with the occlusal guide.

7. A method of claim 2, which comprises mounting an occlusal guide in cooperation with the articulator at said other reference point in proper position with respect to the inter-ridge space of the casts and making an occlusal reconstruction in the articulator involving the use of at least one of the casts and in conformity with the occlusal guide.

References Cited by the Examiner

UNITED STATES PATENTS

| | | | |
|---|---|---|---|
| 1,550,339 | 8/25 | Branson et al. | 32—32 |
| 1,674,088 | 6/28 | Bodine | 32—20 |
| 2,418,648 | 4/47 | Kile | 32—19 |
| 2,554,277 | 5/51 | Taylor | 32—19 |
| 3,052,030 | 9/62 | Spence | 32—32 |

FOREIGN PATENTS 127,939  4/50  Sweden.

RICHARD A. GAUDET, *Primary Examiner.*
RICHARD J. HOFFMAN, *Examiner.*